United States Patent [19]

Akizuki

[11] Patent Number: 5,067,053

[45] Date of Patent: Nov. 19, 1991

[54] AUTOMOTIVE HEADLAMP

[75] Inventor: Kunio Akizuki, Shiraokamachi, Japan

[73] Assignee: Ichikoh Industries Ltd., Tokyo, Japan

[21] Appl. No.: 443,449

[22] Filed: Nov. 30, 1989

[30] Foreign Application Priority Data

Nov. 30, 1988 [JP] Japan ............................. 63-300973

[51] Int. Cl.[5] ............................................. B60Q 1/00

[52] U.S. Cl. ..................................... 362/61; 362/297; 362/346; 362/347

[58] Field of Search ................ 362/61, 297, 298, 346, 362/347, 348, 310, 80

[56] References Cited

U.S. PATENT DOCUMENTS

| | | | |
|---|---|---|---|
| 4,422,135 | 12/1983 | McCamy | 362/298 X |
| 4,704,661 | 11/1987 | Kasmatka | 362/346 X |
| 4,779,179 | 10/1988 | Oyama et al. | 362/346 |
| 4,825,344 | 4/1989 | Ichihara et al. | 362/297 X |
| 4,905,133 | 2/1990 | Mayer et al. | 362/348 |
| 4,916,585 | 4/1990 | Nino | 362/346 X |

FOREIGN PATENT DOCUMENTS

| | | | |
|---|---|---|---|
| 234905 | 6/1925 | United Kingdom | 362/346 |

*Primary Examiner*—Ira S. Lazarus
*Assistant Examiner*—Sue Hagarman
*Attorney, Agent, or Firm*—Foley & Lardner

[57] ABSTRACT

In a headlamp having a light-diverging concave mirror, the inner reflecting surface of the concave mirror is a composite paraboloidal surface of revolution made of multiple different paraboloidal surfaces of revolution taking as common focus a predetermined point on the optical axis and smoothly joined to each other, and the lamp bulb is so disposed as to have the center thereof disposed as substantially coincident with the common focus. Each of the different paraboloidal surfaces of revolution composing the inner reflecting surface reflects the rays incident from the lamp bulb in directions away from the optical axis in a horizontal plane in which the optical axis lies, in directions parallel to the optical axis or in directions nearer to the optical axis. Since the angles of the reflected rays with respect too the optical axis are different depending upon their distances from the common focus, the luminous intensity distribution pattern can have an ample amount of light and the pattern can be extended nearly uniformly from its center horizontally to the right and left, and also the light amount can be adjusted. Therefore, the rays emitted from the lamp bulb can be utilized most effectively for illumination of the road surface.

13 Claims, 3 Drawing Sheets

AUTOMOTIVE HEADLAMP

BACKGROUND OF THE INVENTION a) Field of the Invention:

The present invention relates to an automotive headlamp, and more particularly to an automotive headlamp with a reflector which horizontally diverges light rays emitted from the light source, namely, a light-diverging reflector.

b) Description of the Prior Art:

In headlamps for motor vehicles, the geometrical shape of the inner reflecting surface of the reflector is determined depending upon the luminous intensity distribution pattern required of the headlamps. The commonest shape is a paraboloidal surface of revolution as shown in FIG. 1. In a headlamp with a reflector of which the inner reflecting surface is part of a paraboloid of revolution, a lamp bulb (not shown) is disposed near the focus F of the reflecting surface 1 shaped as a part of a paraboloid of revolution and the light rays emitted from the light source are reflected at the reflecting surface 1 in directions generally parallel to the optical axis z. The rays are refracted by the multiple light-diverging prisms 2*a* formed on the inner surface of the outer lens 2 and projected to the right and left from the outer surface of the outer lens at predetermined angle, for example, $-\theta o$ and $\theta m$, formed with respect to the optical axis z. The luminous intensity distribution pattern defined on a test screen by the light rays from the headlamp with the reflecting surface 1 of this type being a part of a paraboloid of revolution is a horizontally long pattern of a relatively uniform brightness extending at angles $+\theta m$ and $-\theta m$ to the right and left as shown in FIG. 2. The headlamp of this type is advantageous because its luminous intensity distribution pattern is one required of the automotive headlamps, but it is disadvantageous in that the light loss at the light-diverging prism 2*a* is large.

FIG. 3 schematically shows the optical system of a headlamp with a so-called light-diverging reflector, already proposed to eliminate the disadvantages of the reflecting surface having the aforementioned form of a paraboloid of revolution. The inner reflecting surface 3 of this reflector reflects the light rays emitted from the light source F and incident upon positions away from the optical axis z in directions away from the optical axis. Namely, at the center of the inner reflecting surface, the rays incident from the light source F are reflected in the direction of the optical axis z while at a position outwardly farther from the optical axis z, the incident rays are reflected in directions of which the angle with respect to the optical axis is larger. The rays incident upon the right and left ends, the incident rays are reflected at angles $+\theta m$ and $-\theta m$ respectively, with respect to the optical axis. Also, for effective utilization of the rays emitted directly forward from the light source without being incident upon the reflecting surface 3, a supplemental spherical mirror 4 (indicated with dash line in FIG. 3) may be provided which reflects toward the reflecting surface 3 the rays emitted forward from the light source F, but this arrangement is not advantageous since the directions of the rays reflected near the center of the inner reflecting surface are not sufficiently large with respect to the optical axis and the supplemental spherical mirror 4 will block the light rays. The luminous intensity distribution pattern formed on a test screen by the rays from the headlamp with the reflector having a single reflecting surface of this kind can have a certain angle of vertical divergence at the center of the screen because of the filament size but has extremely small angles of vertical divergence at both the right and left ends, as shown in FIG. 4. So the headlamp of this type cannot illuminate the road surface uniformly.

FIG. 5 schematically illustrates the optical system of a headlamp having a reflector already proposed to eliminate the disadvantages of the aforementioned reflecting surface. The inner reflecting surface of this reflector 5 reflects the rays emitted from the light source F and incident upon positions away from the optical axis z in directions rather parallel to the optical axis. Namely, at the center of the inner reflecting surface, the incident rays from the light source F are reflected at divergent angles m with respect to the direction of the optical axis z. At positions outwardly farther from the optical axis z, the incident rays are reflected in directions of which the angle m with respect to the optical axis is smaller. And at the right and left ends outwardly farthest from the optical axis z, the incident rays are reflected in directions parallel to the optical axis z. The luminous intensity distribution pattern formed on a test screen by the rays from the headlamp having with a reflector having a single reflecting surface of which the reflecting characteristics are as mentioned above can have a certain angle of vertical divergence at both the right and left ends but has an extremely small angle of vertical divregence at the center, as shown in FIG. 6. So, the headlamp of this type cannot illuminate the road surface uniformly.

SUMMARY OF THE INVENTION

The present invention has an object to provide a headlamp having a reflector specially designed to effectively utilize the light rays from the light source for illumination of the road surface.

The present invention has another object to provide an improved headlamp having a light-diverging reflector which can project the rays emitted from the light source uniformly in horizontal directions in a predetermined range of angle The present invention has still another object to provide an improved headlamp having a light-diverging reflector usable in conjunction with a supplemental reflecting surface to utilize further effectively the rays emitted from the light source.

The above-mentioned objects can be attained by providing a headlamp comprising, according to the present invention, a concave mirror having an inner reflecting surface, a lamp bulb as light source having the center thereof disposed nearly on the optical axis of the concave mirror and a substantially transparent cover disposed in front of the lamp bulb and covering the front opening of the concave mirror, the inner reflecting surface of the concave mirror being a composite paraboloidal surface of revolution made of parts of multiple different paraboloidal surfaces of revolution taking as common focus a predetermined point on the optical axis and smoothly joined to each other and the lamp bulb being so disposed as to have the center thereof disposed in the vicinity of the common focus. The center axis of each paraboloidal surface of revolution is a straight line passing through the common focus and offset a predetermined angle from the optical axis in a horizontal plane in which the optical axis lies. The inner reflecting surface consists of a first reflecting zone, a second reflecting zone adjoining the first reflecting zone and a third reflecting zone adjoining the second reflecting zone, which are defined depending upon their distances from the common focus. The plural paraboloidal surfaces of revolution belonging to the first reflecting zone reflect or diverge the light rays emitted from the lamp bulb and incident upon positions nearer to the common focus in directions farther from the optical axis. The plural paraboloidal surfaces of revolution included in the second reflecting zone reflect the rays incident from the lamp bulb in directions nearly parallel to the optical axis. And the plural paraboloidal surfaces of revolution belonging to the third reflecting zone reflect or converge the rays emitted from the lamp bulb and incident upon positions farther from the common focus in directions nearer to the optical axis. All the rays reflected at the first, second and third reflecting zones, respectively, are directed parallelly to a horizontal plane in which the optical axis lies, but since the angles of these directions with respect to the optical axis are different depending upon their distances from the common focus, the luminous intensity distribution pattern can have an ample amount of light and the pattern can be extended nearly uniformly from its center horizontally to the right and left, and also the light amount can be adjusted by changing the geometrical shape of each paraboloidal surface of revolution and the areas of the reflecting zones. Therefore, the rays emitted from the lamp bulb can be utilized most effectively for illumination of the road surface.

BRIEF DESCRIPTION OF THE DRAWINGS

FIG. 8 (B) is a schematic drawing of the luminous intensity distribution pattern formed on a test screen by the rays reflected at the left half of the inner reflecting surface shown in FIG. 7;

FIG. 8 (C) is a schematic drawing of a total pattern composed of the patterns shown in FIGS. 8 (A) and (B)

DETAILED DESCRIPTION OF THE PREFERRED EMBODIMENTS

Figure 1:
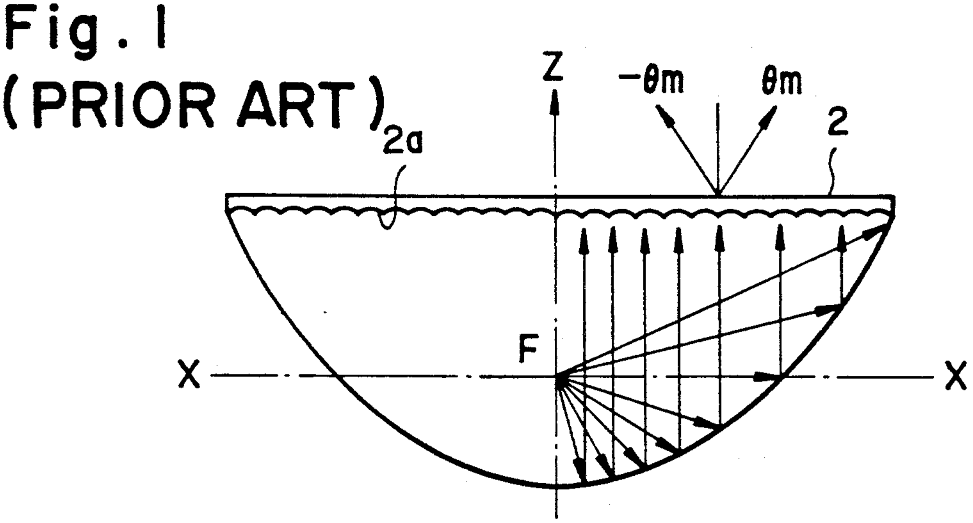
Fig. 1 (PRIOR ART)
FIG. 1 is a schematic drawing of the optical system of a conventional headlamp having a single inner reflecting surface taking the form of a part of a paraboloidal surface
Figure 2:
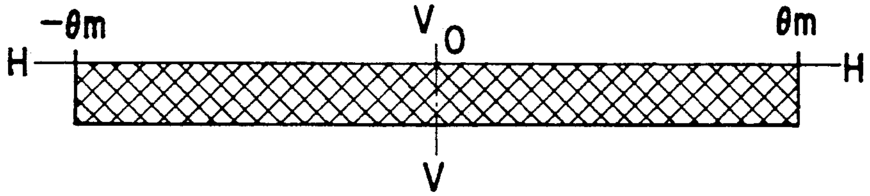
Fig. 2 (PRIOR ART)
FIG. 2 is a schematic drawing of the luminous intensity distribution pattern formed on a test screen by the light rays projected from the optical system of FIG. 1.
Figure 3:
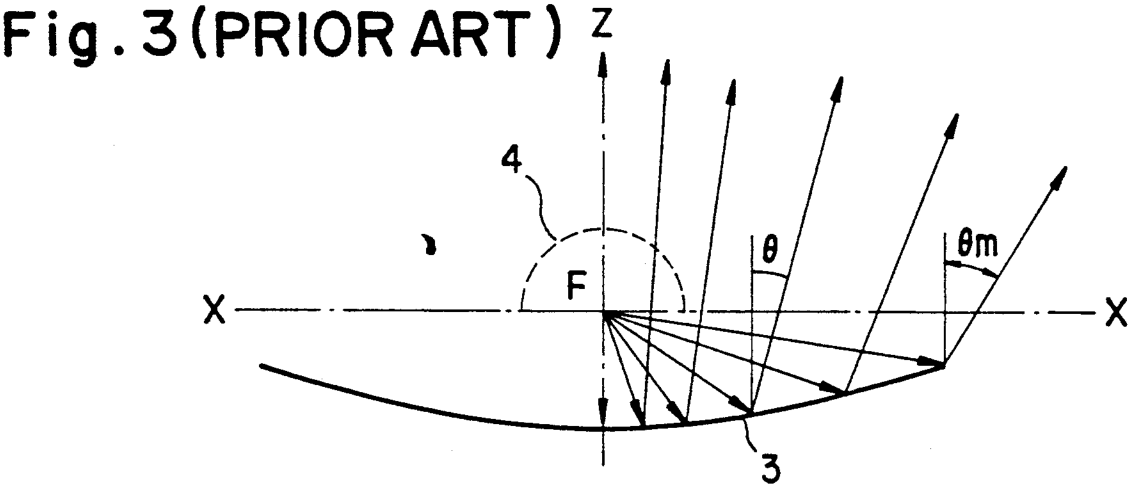
Fig. 3 (PRIOR ART)
FIGS. 3 and 5 are schematic drawings of the optical systems of other conventional headlamps, respectively, with an inner reflecting surface taking the form of a composite paraboloidal surface of revolution.
Figure 4:
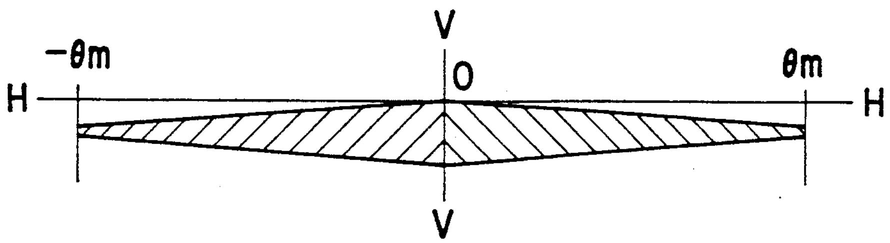
Fig. 4 (PRIOR ART)
FIGS. 4 and 6 are schematic drawings of the luminous intensity distribution patterns, respectively, formed on a test screen by the rays projected from the optical systems of FIGS. 3 and 5, respectively.
Figure 5:
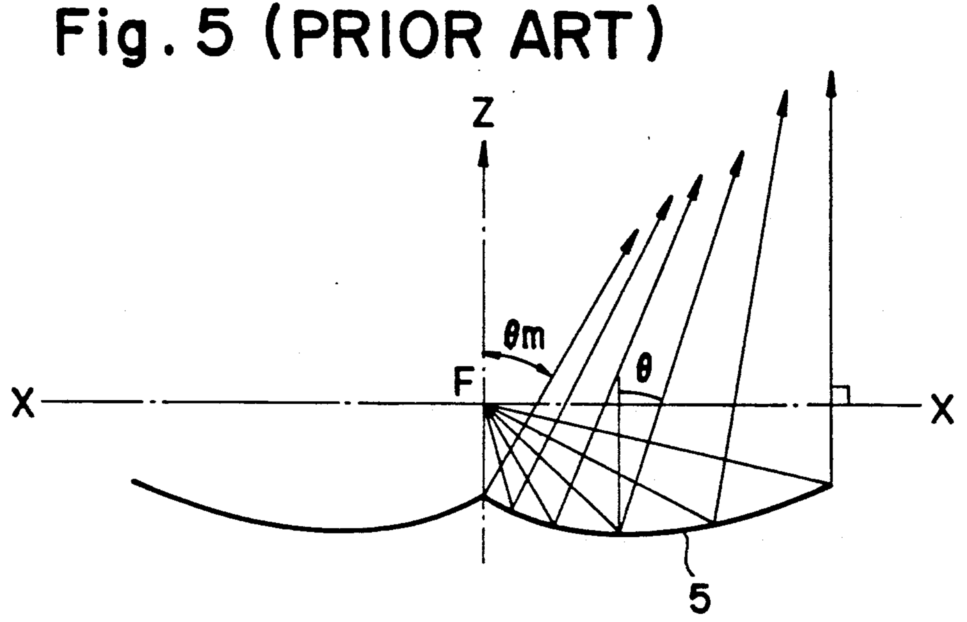
Fig. 5 (PRIOR ART)
Figure 6:
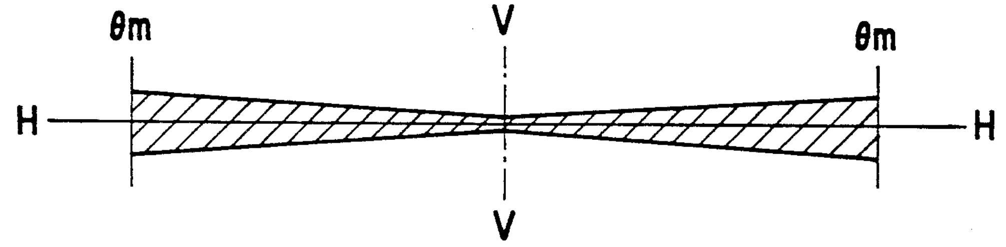
Fig. 6 (PRIOR ART)
Figure 7:
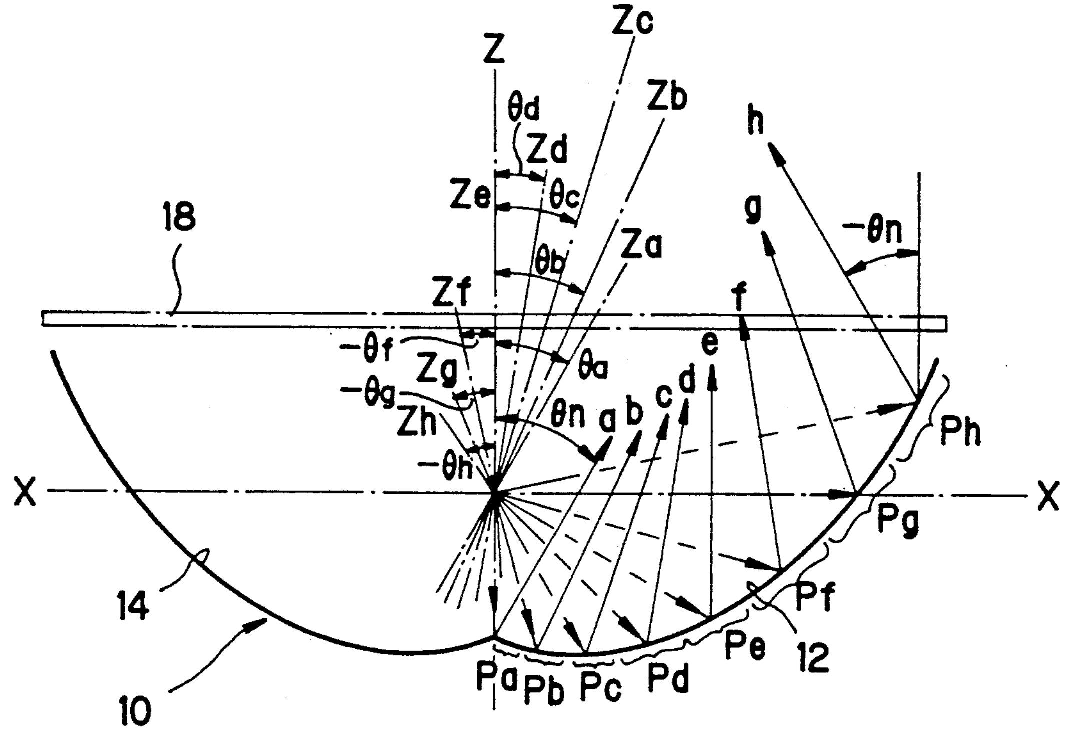
FIG. 7 is a schematic drawing of the optical system of one embodiment of the headlamp according to the present invention.

The embodiments of the automotive headlamp according to the present invention will be described herebelow with reference to FIGS. 7 to 9. FIG. 7 schematically shows the optical system of one embodiment of the headlamp according to the present invention. The inner reflecting surface of a concave mirror 10 is shown in a sectional view taken along the horizontal plane in which the optical axis Z lies. The inner reflecting surface of the concave mirror 10 consists of two reflecting surfaces symmetrical to each other with respect to a vertical plane (perpendicular to the drawing sheet) in which the optical axis Z lies, that is, the right half reflecting surface 12 and left half reflecting surface 14. The reflecting characteristics of the right half reflecting surface 12 alone are shown, but it will be apparent that the reflecting characteristics of the left half reflecting surface 14 are symmetrical to those of the right half reflecting surface with respect to the vertical plane in which the optical axis Z lies.

The inner reflecting surface of the concave mirror 10 in this embodiment takes the form of a composite paraboloidal surface of revolution made of parts of multiple different paraboloidal surfaces of revolution taking as their common focus a predetermined point on the optical axis Z and which are smoothly joined to each other. The composite paraboloidal surface of revolution is so formed that the rays incident from the lamp bulb are reflected in directions a predetermined angle away from the optical axis Z, in directions parallel to the optical axis Z or in directions nearer to or toward the optical axis Z, according to the distances of the incident points from the common focus. Also, the shape of the concave mirror 10 as viewed from the front opening thereof is generally a horizontally long rectangle, which is not shown. As shown in FIG. 7, the right half reflecting surface 12 is formed by parts of paraboloidal surfaces Pa, Pb, Pc, Pd, Pe, Pf, Pg and Ph taking as common focus a predetermined point on the optical axis and which are smoothly joined to each other, while the left half reflecting surface 14 is formed by parts of paraboloidal surfaces of revolution symmetrical to the surfaces Pa, Pb, Pc, Pd, Pe, Pf, Pg and Ph with respect to the vertical plane in which the optical axis Z lies and also smoothly joined to each other. The lamp bulb has the center F thereof disposed as substantially coincident with the common focus. In this embodiment, there is further provided in front of the lamp bulb F and nearly perpendicular to the optical axis Z a substantially transparent cover covering the front opening of the concave mirror 10. The center axes Za, Zb, Zc, Zd, Ze, Zf, Zg and Zh of the above-mentioned paraboloidal surfaces of revolutions pass through the common focus F and are offset by predetermined angles, respectively, from the optical axis Z in a horizontal plane in which the optical axis Z lies. Namely, the center axis Za of the paraboloidal surface of revolution forms the largest angle $\theta a$ ($\theta a = \theta n$) with respect to the optical axis, and the center axes Zb, Zc and Zd of the paraboloidal surfaces of revolution Pb, Pc and Pd form angles $\theta b$, $\theta c$ and $\theta d$, respectively, with respect to the optical axis Z ($\theta a > \theta b > \theta c >> \theta d$). Also, the center axis Ze of the paraboloidal surface of revolution Pe is nearly coincident with the optical axis Z, and the center axis Zf, Zg and Zh of the paraboloidal surfaces of revolution Pf, Pg and Ph form angles $-\theta f$, $-\theta g$ and $-\theta h$, respectively, with respect to the optical axis Z ($\theta f > \theta g > \theta h$). The paraboloidal surfaces of revolution Pa, Pb, Pc and Pd included in the right half reflecting surface 12 and the paraboloidal surfaces of revolution in the left half reflecting surface 14 and symmetrical to those in the right half reflecting surface with respect to the vertical plane in which the optical axis Z lies, form together a first reflecting zone, and the paraboloidal surfaces of revolution nearer to the optical axis Z reflect the rays emitted from the lamp bulb and incident upon positions nearer to the optical axis Z in directions farther from the optical axis Z in a predetermined range of angles. Namely, the paraboloidal surface of revolution Pa nearest to the optical axis Z and the paraboloidal surface of revolution laid in the left half reflecting surface 14 and which is symmetrical to the surface Pa with respect to the vertical plane in which the optical axis Z lies reflect the rays incident from the lamp bulb in directions away from the optical axis Z at angles $+\theta n$ and $-n$ ($\theta n = \theta a$), respectively, with respect to the optical axis Z, as indicated with arrow a. The paraboloidal surfaces of revolution Pb, Pc and Pd adjoining the paraboloidal surface of revolution Pa and the paraboloidal surfaces of revolution lying in the left half reflecting surface 14 and symmetrical to the surfaces Pb, Pc and Pd with respect to the vertical plane in which the optical axis Z lies reflect the rays incident from the lamp bulb in directions away from the optical axis Z at angles $\theta b$, $\theta c$ and $\theta d$, respectively, with respect to the optical axis Z and which are gradually smaller than the angles $+\theta n$ and $-\theta n$, as indicated with arrows b, c and d. Also the paraboloidal surface of revolution Pe in the right half reflecting surface 12 and the paraboloidal surface of revolution laid in the left half reflecting surface and symmetrical to the surface Pe with respect to the vertical plane in which the optical axis Z lies form together a second reflecting zone and reflect the rays incident from the lamp bulb in directions generally parallel to the optical axis Z, as indicated with arrow e. Further, the paraboloidal surfaces of revolution Pf, Pg and Ph in the right half reflecting surface 12 and the paraboloidal surfaces of revolution lying in the left half reflecting surface 14 and symmetrical to the surfaces Pf, Pg and Ph with respect to the vertical plane in which the optical axis Z lies form together a third reflecting zone and reflect the rays emitted from the lamp bulb and incident upon positions farther from the lamp bulb in directions nearer to the optical axis Z in a predetermined range of angle. Namely, the paraboloidal surface of revolution Ph farthest from the optical axis Z and the paraboloidal surface of revolution lying in the left half reflecting surface 14 and symmetrical to the surface Ph with respect to the optical axis Z reflect the rays incident from the lamp bulb in directions nearer to the optical axis Z with angles $-\theta n$ and $+\theta n$ ($-\theta n \quad -\theta h$), respectively, with respect to the optical axis Z, as indicated with arrow h, and the paraboloidal surfaces of revolution Pg and Pf adjoining the surface Ph and the paraboloidal surfaces of revolution lying in the left half reflecting surface 14 and symmetrical to the surfaces Pg and Pf with respect to the vertical plane in which the optical axis Z lies reflect the rays incident from the lamp bulb in directions nearer to the optical axis Z at angles $-\theta g$ and $+\theta g$ and $-\theta f$ and $+\theta f$, respectively, with respect to the optical axis Z, which are gradually smaller than the angles $-\theta n$ and $+\theta n$, respectively, as indicated with arrows g and f, respectively. According to this embodiment, the paraboloidal surface P2 forming the second reflecting zone and the paraboloidal surface of revolution lying in the left half reflecting surface and symmetrical to the surface Pe with respect to the vertical plane in which the optical axis Z lies are disposed nearly at the intermediate position between the right half reflecting surface 12 and left half reflecting surface 14. The areas of these paraboloidal surfaces of revolution are determined taking in consideration the area of each of the paraboloidal surfaces of revolution composing the first and third reflecting zones in order to obtain a desired luminous intensity distribution pattern and luminous intensity distribution.

Figure 8:
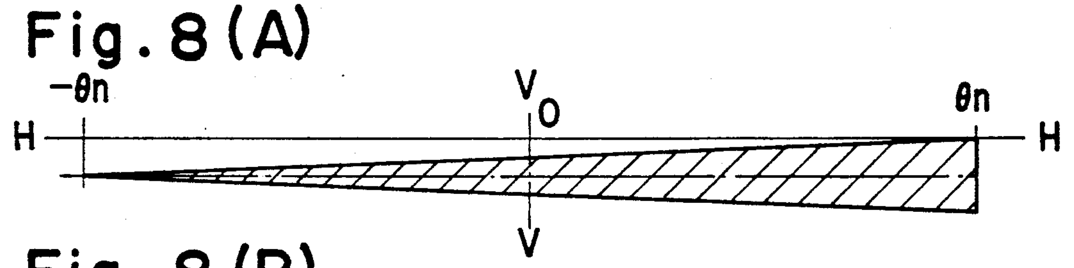
FIG. 8 (A) is a schematic drawing of the luminous intensity distribution pattern formed on a test screen by the rays reflected at the right half of the inner reflecting surface shown in FIG. 7.
Figure 8:
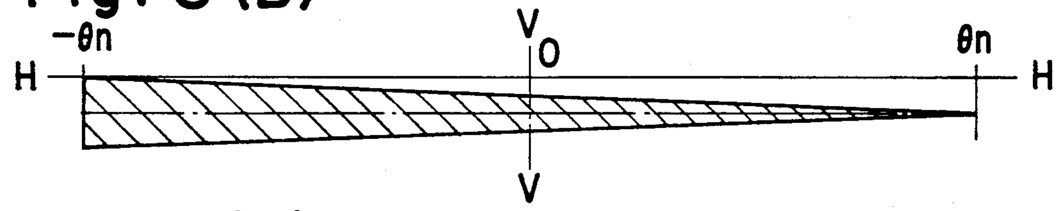
Figure 8:
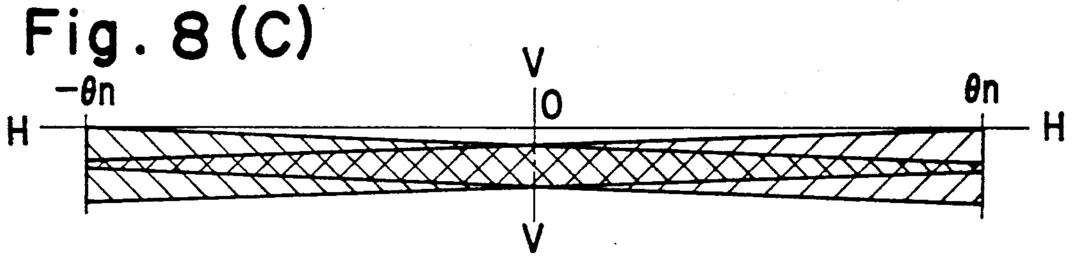

FIG. 8 (A) shows a luminous intensity distribution pattern formed on a test screen disposed ahead of the transparent cover 18 covering the front opening of the concave mirror 10 by the rays reflected at the paraboloidal surfaces of revolution composing the above-mentioned right half reflecting surface 12. As obvious from the luminous intensity distribution pattern, the rays reflected at the first reflecting zone (formed by the paraboloidal surfaces of revolution Pa, Pb, Pc and Pd) are directed in the horizontal plane in which the optical axis lies and form a horizontally long pattern extending within a range of the angle $\theta n$ rightward from the center and of which the angle of vertical divergence is gradually smaller. The rays reflected at the second reflecting zone (formed by the paraboloidal surface of revolution Pe) are directed in the horizontal plane in which the optical axis lies and reflected in directions generally parallel to the optical axis, and thus form a luminous intensity distribution pattern located near the center of the screen and of which the angle of vertical divergence is a medium one. The rays reflected at the third reflecting zone (composed of the paraboloidal surfaces of revolution Pf, Pg and Ph) are directed in the horizontal plane in which the optical surface lies and form a luminous intensity distribution pattern extending within a range of the angle $-\theta n$ leftward from the center and of which the angle of vertical divergence is relatively small. FIG. 8 (B) shows a luminous intensity distribution pattern formed on a test screen disposed ahead of the transparent cover 18 covering the front opening of the concave mirror 10 by the rays reflected at the paraboloidal surfaces of revolution forming the above-mentioned left half reflecting surfaces. As seen, this pattern is symmetrical to the pattern defined by the rays reflected at the right half reflecting surface with respect to the vertical line V-V. Namely, the light rays reflected at the paraboloidal surfaces of revolution symmetrical to the surfaces Pa, Pb, Pc and Pd, respectively, with respect to the vertical plane in which the optical axis Z lies form a horizontally long luminous intensity distribution pattern extending similarly leftward from the center within a range of the angle $-\theta n$ and of which the angle of vertical divergence is gradually smaller. The rays reflected at the paraboloidal surface of revolution symmetrical to the surface Pe with respect to the vertical plane in which the optical axis Z lies form near the center of the test screen a luminous intensity distribution pattern of which the angle of vertical divergence is a medium one. The rays reflected at the paraboloidal surfaces of revolution symmetrical to the surfaces Pf, Pg and Ph with respect to the vertical plane in which the optical axis Z lies form a luminous intensity distribution pattern extending similarly rightward from the center within a range of the angle $\theta n$ and of which the angle of vertical divergence is relatively small. Therefore, as seen from FIG. 8 (C), the rays incident from the lamp bulb upon the inner reflecting surface of the concave mirror 10 are directed in the horizontal plane in which the optical axis Z lies and form a horizontally long and generally uniformly bright pattern extending horizontally to the right and left from the center within ranges of the angle $+\theta n$ and $-\theta n$, respectively.

The inner reflecting surface of the concave mirror 10 according to this embodiment is formed by the right half reflecting surface 12 and left half reflecting surface 14, symmetrical to each other with respect to the vertical plane in which the optical axis Z lies, but the present invention is not limited to this arrangement. For example, in case the concave mirror 10 according to the present invention is used as a headlamp, of which the front lens covering the front opening of the concave mirror 10 is slanted with respect to the optical axis Z, that is, a headlamp having a so-called slant type front lens, the required reflecting characteristics imparted to the right half reflecting surface 12 and left half reflecting surface 14, respectively, may be different from each other.

Furthermore in this embodiment, the right half reflecting surface 12 takes the form of a composite paraboloidal surface of revolution made of parts of eight paraboloidal surfaces of revolution Pa, Pb, Pc, Pd, Pe, Pf, Pg and Ph taking as common focus a predetermined point on the optical axis Z and smoothly joined together, but the present invention is not limited to this arrangement. For example, the right half reflecting surface 12 may be 150 to 200 different paraboloidal surfaces of revolution having a common focus and the left half reflecting surface 14 may be formed by paraboloidal surfaces of revolution symmetrical to the surfaces Pa to Ph with respect to the vertical plane in which the optical axis Z lies. In this case, the boundaries between the paraboloidal surfaces forming the right half reflecting surface 12 and left half reflecting surface 14 exist in plural planes parallel to the vertical plane in which the optical axis Z lies and each of the paraboloidal surfaces of revolution is an elongated stripe-like reflecting curved surface about 1 mm wide and 100 mm long and they are smoothly joined to each other. The technique for joining such multiple reflecting curved surfaces to form an inner reflecting surface having predetermined reflecting characteristics is well known per se, and so will not be explained any further.

Figure 9:
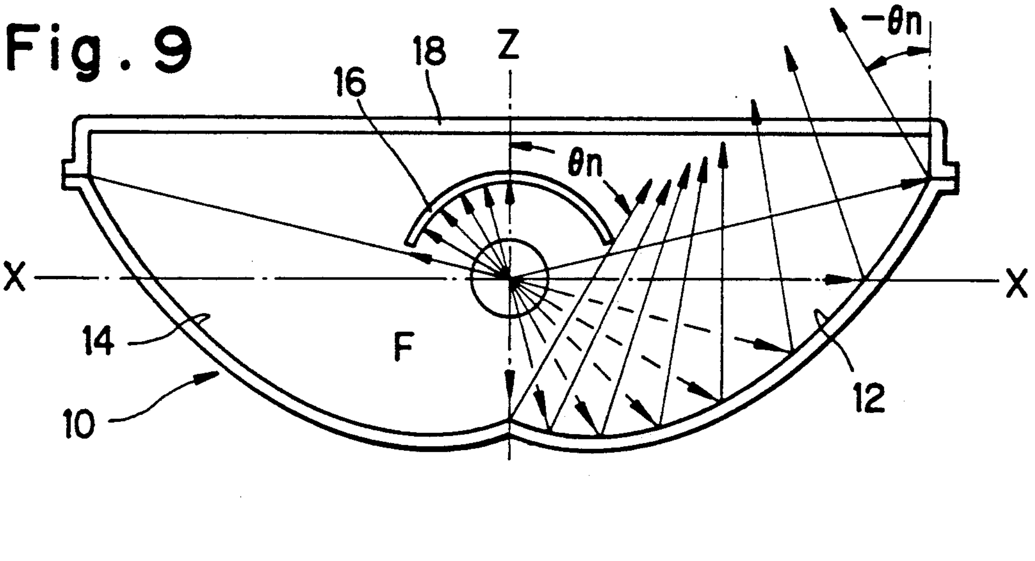
FIG. 9 is a schematic drawing of the optical system of another embodiment of the headlamp according to the present invention.

FIG. 9 schematically shows another embodiment of the optical system of the headlamp according to the present invention. The same or similar elements as in FIG. 7 are indicated with the same or similar reference numerals or symbols. In this embodiment, there is provided a supplemental reflecting surface 16 between the lamp bulb F and front cover 18. This supplemental reflecting surface 16 is provided to effectively utilize the rays emitted from the lamp bulb F toward the front cover 18. It is disposed in such a position that it will not block the rays reflected at the paraboloidal surface of revolution Pa and the one symmetrical to this surface Pa with respect to the vertical plane in which the optical axis Z lies, namely, within a range in which angles $+\theta n$ and $-\theta n$ are formed with respect to the optical axis Z. The supplemental reflecting surface 16 reflects the rays incident from the light bulb toward the first to third reflecting zones. In this embodiment, the supplemental reflecting surface 16 is formed by a part of a single spherical surface taking as center the center of the lamp bulb F, that is, the common focus. The majority of the rays incident from the lamp bulb is reflected toward the first and second reflecting zones while the smaller remainder is reflected toward the third reflecting zone, so that the rays incident from the lamp bulb can be further effectively utilized for illumination of the front road surface than the first embodiment having previously been described. Since the majority of the rays emitted from the lamp bulb are reflected once at the inner reflecting surface of the concave mirror 10 and then directed forward, the lamp bulb is hidden by the supplemental reflecting surface 16 and cannot be seen from front. In this embodiment, the supplemental reflecting surface 16 is composed of a part of a single spherical surface, but the present invention is not limited to this arrangement. It may be formed by a composite curved surface or any other curved surface than a spherical surface which will reflect the rays incident from the lamp bulb mainly toward the first and second reflecting zones.

In the headlamp according to the present invention, having been described in the foregoing, the light rays reflected at the first to third reflecting zones forming the inner reflecting surface of the concave mirror are all directed in directions parallel to the horizontal plane in which the optical axis lies, but since the angles of the reflected rays with respect to the optical axis are different according to their distances from the common focus, the luminous intensity distribution pattern can have an ample amount of light and spread generally uniformly from the center horizontally to the right and left, and the light amount can be adjusted. Therefore, the rays emitted from the lamp bulb can be most effectively utilized for illumination of the road surface.

What is claimed is:

1. An automotive headlamp, comprising a concave mirror having an inner reflecting surface, a lamp bulb as light source having its center thereof disposed nearly on an optical axis of said concave mirror and a substantially transparent cover disposed in front of said lamp bulb and covering the concave mirror, the inner reflecting surface of said concave mirror being composed of multiple different paraboloidal surfaces of revolution taking as common focus a predetermined point on said optical axis and smoothly joined to each other and said lamp bulb being so disposed as to have the center thereof disposed in the vicinity of the common focus, the center axis of each paraboloidal surface of revolution being a straight line passing through the common focus and offset a predetermined angle from said optical axis in a horizontal plane in which said optical axis lies, the inner reflecting surface consisting of a first reflecting zone, a second reflecting zone adjoining said first reflecting zone and a third reflecting zone adjoining said second reflecting zone, which are defined depending upon their distances from the common focus, said plural paraboloidal surfaces of revolution belonging to said first reflecting zone reflecting or diverging the light rays emitted from said lamp bulb and incident upon positions nearer to the common focus in directions away from said optical axis, the plural paraboloidal surfaces of revolution included in said second reflecting zone reflecting the rays incident from said lamp bulb in directions nearly parallel to said optical axis, and the plural paraboloidal surfaces of revolution belonging to said third reflecting zone reflecting or converging the rays emitted from said lamp bulb and incident upon positions away from the common focus in directions nearer to said optical axis.

2. An automotive headlamp according to claim 1, wherein a profile of the inner reflecting surface of said concave mirror is generally a horizontally long rectangle and a boundary between each of said paraboloidal surfaces of revolution and the other paraboloidal surface of revolution adjoining the former is in a plane parallel to a vertical plane in which said optical axis lies.

3. An automotive headlamp according to claim 2, wherein the paraboloidal surface of revolution belonging to said first reflecting zone and nearest to said optical axis reflect the rays incident from said lamp bulb in directions of a predetermined angle away from said optical axis while the paraboloidal surface of revolution belonging to said third reflecting zone and farthest from said optical axis reflect the rays incident from said lamp bulb in directions said predetermined angle nearer to said optical axis.

4. An automatic headlamp according to claim 2, wherein each of said paraboloidal surfaces of revolution composing said first to third reflecting zones is made of a pair of reflecting curved surfaces substantially symmetrical with respect to a vertical plane in which said optical axis lies.

5. An automotive headlamp according to claim 4, further comprising a supplemental reflecting surface disposed between said lamp bulb and said front cover and which reflects the rays incident from said lamp bulb in said predetermined range of angle with respect to said optical axis toward any of said first, second and third reflecting zones.

6. An automotive headlamp according to claim 5, wherein said supplemental reflecting surface is made of a part of a spherical surface having the center thereof disposed at a point near said predetermined point.

7. The headlight of claim 1, in which each part of the mirror contains a different number of surfaces of revolution than does the other.

8. An automotive headlamp, comprising a reflector having at least an inner reflecting surface, a lamp bulb as light source having its center thereof disposed on an optical axis of the inner reflecting surface of said reflector and a front lens disposed in of said lamp bulb, covering the front inner reflecting surface and which has predetermined optical characteristics, the inner reflecting surface of said concave mirror being composed of multiple different paraboloidal surfaces of revolution taking as common focus a predetermined point on said optical axis and smoothly joined to each other and said lamp bulb being so disposed as to have the center thereof disposed in the vicinity of the common focus, the center axis of each paraboloidal surface of revolution being a straight line passing through the common focus and offset a predetermined angle from said optical axis in a horizontal plane in which said optical axis lies, the inner reflecting surface consisting of a first reflecting zone, a second reflecting zone adjoining said first reflecting zone and a third reflecting zone adjoining said second reflecting zone, which are defined depending upon their distances from the common focus, said plural paraboloidal surfaces of revolution belonging to said first reflecting zone reflecting or diverging the light rays emitted from said lamp bulb and incident upon positions nearer to the common focus in directions away from said optical axis, the plural paraboloidal surfaces of revolution included in said second reflecting zone reflecting the rays incident from said lamp bulb in directions nearly parallel to said optical axis, and the plural paraboloidal surfaces of revolution belonging to said third reflecting zone reflecting or converging the rays emitted from said lamp bulb and incident upon positions away from the common focus in directions nearer to said optical axis.

9. A vehicle headlight, comprising:

a light reflecting mirror formed in two symmetrical parts, each part being formed of paraboloidal surfaces of revolution contiguously and smoothly joined to each other and having a common focus at a predetermined point on the optical axis of the mirror;

a light source located at the common focus; wherein the surfaces of revolution are each offset at a predetermined angle in the horizontal plane with respect to the optical axis to reflect light from the light source in different directions; and a cover for sealing the headlight.

10. The headlight of claim 9, wherein the rays incident to the mirror are reflected in the horizontal plane in a direction away from the optical axis, a direction parallel to the optical axis or a direction toward the optical axis.

11. The headlight of claim 10, wherein the surfaces of revolution are each formed of stripe-like elongated reflection surfaces.

12. The headlight of claim 10, wherein the surfaces of revolution closest to the optical azis in the horizontal plane reflect light in a direction away from the optical axis, the surfaces of revolution furthest from the optical axis reflect light toward the optical axis and the surfaces of revolution intermediately located therebetween reflect light in a direction generally parallel to the optical axis.

13. The headlight of claim 9, further including a curved mirror located on the optical axis separated by the common focus from the surfaces of revolution.

* * * * *